United States Patent [19]

Munch

[11] Patent Number: 5,785,815
[45] Date of Patent: Jul. 28, 1998

[54] PROCESS FOR DAMPING PRESSURE PULSATIONS AND APPARATUS FOR PERFORMING THE PROCESS

[75] Inventor: Rudolf Munch, Ravensburg, Germany

[73] Assignee: Sulzer-Escher Wyss GmbH, Ravensburg, Germany

[21] Appl. No.: 358,588

[22] Filed: Dec. 13, 1994

[30] Foreign Application Priority Data

Dec. 17, 1993 [DE] Germany ............ 43 43 290.5

[51] Int. Cl.$^6$ ........................... D21F 1/06
[52] U.S. Cl. ............ 162/198; 162/216; 162/259; 162/263; 162/336; 162/343; 162/380; 162/DIG. 11; 137/14; 137/207; 137/826; 137/829; 137/831; 138/26; 138/30
[58] Field of Search ............ 162/216, 198, 162/336, 339, 259, 263, 340, 341, 343, 380; 138/26, 30; 137/14, 207, 826, 829, 831

[56] References Cited

U.S. PATENT DOCUMENTS

| | | | |
|---|---|---|---|
| 4,030,971 | 6/1977 | Justus | 162/341 |
| 4,262,700 | 4/1981 | Moen | 162/380 |
| 4,308,095 | 12/1981 | Brendemuehl | 162/380 |
| 4,523,977 | 6/1985 | Cantini | 162/380 |
| 4,750,523 | 6/1988 | Crouse | 138/30 |
| 4,956,050 | 9/1990 | Makela | 162/336 |

FOREIGN PATENT DOCUMENTS

| | | | |
|---|---|---|---|
| 1133791 | 10/1982 | Canada | 162/343 |

OTHER PUBLICATIONS

Offical German Office Action dated Jul. 14, 1988.

*Primary Examiner*—Peter Chin
*Attorney, Agent, or Firm*—Greenblum & Bernstein P.L.C.

[57] ABSTRACT

Process for damping pressure pulsations and apparatus for performing the process. The process of this invention serves for the damping of pressure pulsations in a fluid, particularly a fiber suspension, flowing in a closed system wherein the pressure pulsations to be damped are measured at a measuring site and compensated at a correction site, with a throttle position being located between the measuring and the correction sites, with the damping of the imparted pressure impulses occurring at the correction site, which pressure impulses are opposite to the measured pressure pulsations, with the time periods thereof being about the same as those of the measured pressure pulsations. Several apparatuses for performing the process are also set forth.

27 Claims, 2 Drawing Sheets

PROCESS FOR DAMPING PRESSURE PULSATIONS AND APPARATUS FOR PERFORMING THE PROCESS

CROSS REFERENCE TO RELATED APPLICATIONS

This application claims the priority of German Application No. DE P 43 43 290.5, filed Dec. 17, 1993, the disclosure of which is incorporated herein by reference in its entirety.

BACKGROUND OF THE INVENTION

1. Field of the Invention

The invention pertains to a process for the damping or attenuation of pressure pulsations in a fluid, such as a fiber suspension, flowing in a closed system, the process including measuring, in at least one place within the system, at a measuring site, pressure pulsations that are to be damped; and imparting, in at least one further place within the system, at a correction site, pressure impulses into the flowing fluid.

The generic forming process is of particular importance in the flow of a fiber suspension in the region of the breast box of a papermaking machine and will be described and discussed hereinafter with reference to this example.

2. Discussion of the Background of the Invention and Material Information

Fiber material suspensions, for the purpose of paper production, are brought onto one or two circulating or rotary sieves or screens with the aid of a breast box. Thereby, the fiber material suspension is conveyed in a closed system, which means that it is substantially surrounded on all sides by walls and is under pressure which differs from ambient pressure. When, regardless of the reason, pressure pulsations are present within such a closed system, they propagate within the system and lead, during the exit of the fluid or liquid from the closed system, that is in the present example at the exit gap of the breast box, to differences in velocity which may be disadvantageous to the successive sheet to be formed. In order to avoid these disadvantages, normally a so-called damping container is utilized, which while expensive, however effectively dampens the pressure pulsations to such a degree or even eliminates same, so that they can no longer negatively influence the quality of the paper.

It should be readily understood that, during other uses of closed systems, pressure pulsations are also undesirable.

One proposal for the damping of pressure pulsations is set forth in U.S. Pat. No. 4,750,523 to Crouse. According thereto, the pressure pulsations are measured and with the aid of the signals that are manipulated in a controller, a membrane, which is in contact with the fluid, is so moved that the pressure impulses are again compensated therethrough. Such system types are generally denominated as active damping systems. While this known process could save the apparatus expense of a damping container in the inlet to the breast box, it is however very complex from the control standpoint and insufficiently effective in the important frequency range for a papermaking machine breast box.

SUMMARY OF THE INVENTION

This invention has the task or object to produce a process for the damping of oscillations in order to increase the effectiveness of known damping systems at the least possible expense.

Specifically, the process of this invention pertains to the damping of pressure pulsations in a fluid, such as a fiber suspension, flowing in a closed system, the process comprising measuring, in at least one place within the system, at a measuring site, pressure pulsations that are to be damped; imparting, in at least one further place within the system, at a correction site, pressure impulses into the flowing fluid; and influencing the pressure impulses according to the time, the indication and the strength of the measurement signals of the pressure pulsation measurement, with the pressure drop within the flowing fluid, between the measuring site and the correction site, being at least half as large as the pressure drop between the correction site and the exit of the flowing fluid from the closed system; with the imparted pressure impulses being, each time, opposite to the pressure pulsations measured at the measuring site as well as occurring in one of substantially at the same time as, and slightly later than, the measured pressure pulsations at the measuring site.

A further embodiment of the process of this invention includes, locating the correction site after the measuring site in the fluid flow direction. Preferably the pressure drop, between the measuring site and the correction site ranges between 0.3 and 3 bar.

Another embodiment of the process of this invention includes, producing the pressure impulses by the deformation of a wall adjoining the fluid at the correction site.

An additional embodiment of the process of this invention includes, producing the pressure impulses via one of the addition and subtraction of a fluid at the correction site.

In a differing embodiment of the process of this invention, the fluid flow, after passing the correction site, undergoes a further pressure drop of at least 1 bar.

In yet a further embodiment of the process of this invention, the pressure drop occurs in a turbulence producer, with the turbulence producer being located between the measuring site and the correction site.

In still another embodiment of the process of this invention, the time instant of the imparted pressure impulse occurs slightly later than that of the measured pressure pulsation that is to be compensated, with the time shift corresponding approximately to a value which results from the distance of the correction site from the measuring site, divided by the acoustic velocity of the fluid.

A still a further embodiment of the process of this invention includes, measuring the acoustic velocity of the fluid within the closed system and utilizing same for the control of the time instant of the pressure impulse.

An apparatus for performing the process of this invention includes a fluid supply chamber with the measuring site and a fluid accumulator chamber with the correction site; a pressure measuring device for the fluid supply chamber; a controller for the manipulation of the measured values; a device for controlling the imparting of pressure impulses in the fluid accumulator chamber; and a hydraulic throttle position, with the throttle position being situated between the fluid supply chamber and the fluid accumulator chamber; with the controller so controlling the pressure impulses that the pressure impulses, during the operation of the apparatus, occur in opposition to the measured pressure pulsations and one of substantially simultaneously and slightly later than the pressure pulsations.

A further embodiment of the apparatus of this invention includes that a turbulence producer, having a plurality of stepped diffusors, is located between the fluid supply chamber and the fluid accumulator chamber, with the correction site being located downstream from the measuring site.

Another embodiment of the apparatus of this invention includes that a turbulence producer, in the form of a static mixer, is located between the fluid supply chamber and the fluid accumulator chamber, with the correction site being located downstream from the measuring site.

In a differing embodiment of the apparatus of this invention the pressure impulse, imparted at the correction site, is transferred to the fluid by means of a controllably deformable wall. In one variation, the deformation is accomplished via a fluid-fillable pressure chamber activated by the controller, with the pressure chamber including a deformable wall on the side facing the fluid. In another variation, the deformation is achieved hydraulically via a piston-cylinder-system activated by the controller. In still a further variation, the deformation is achieved electrically via a piezoelectric element activated by the controller.

In still another embodiment of the apparatus of this invention, the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

In a final embodiment of the apparatus of this invention, the correction site is located on an upper wall of the nozzle chamber which serves as a fluid accumulator chamber and wherein the imparting of the pressure impulses occurs via the use of mechanical parts that serve to receive the static pressure forces, whose forces, acting on the fluid, are variable.

By means of the process of this invention, the measurement and damping of the undesired pressure pulsations are accomplished in different chambers of the closed system, wherein, when viewed in the flow direction, there occurs a substantial drop or loss of pressure. The liquid or fluid within the chamber, where the correction site is located, will oscillate substantially in unison in the frequency range of the pressure pulsations therewithin. This means that the pressure values within this chamber, at the same time, are substantially equal everywhere, so that the propagation velocity of the pressure pulsations is of little consequence. Such conditions, for example, are present when the wave length of the interfering pressure pulsations is at least three times greater than the linear extent of the chamber, with the correction site being located in the stream flow direction. During the industrial utilization in the breast box of a papermaking machine, the interfering frequencies lie under 60 Hz, which have a particularly great influence upon paper quality. The compensation that is initiated at the correction site acts simultaneously in the entire chamber. Since the wave length depends not only upon frequency but also upon the acoustic velocity of the fluid, this can also be measured and manipulated in the controller in order to achieve an even more exact result. It is important that, as a result of the pressure drop, between the measuring site and the correction site, that only a small reaction of the measures taken at the correction site are present at the measuring site, which otherwise would adulterate the measurement. As the liquid continues to flow, it reaches the region of the exit gap of the breast box, where a further pressure drop takes place. The exit from the closed system occurs at the end of an opening or nozzle. At that point, the suspension is freed of interfering pressure pulsations.

It is an advantage that in modern hydraulic breast boxes, generally a hydraulic turbulence producer is utilized which leads to a substantial pressure drop or head loss. This thus presents the possibility for the arrangement of the measuring site upstream of and the correction site downstream of the turbulence producer, when viewed in the stream flow direction. The costs are thus comparatively low. Generally, an exit nozzle follows the breast box chamber, the latter being downstream of the turbulence producer, with the exit nozzle again causing a pressure drop, since pressure is converted to velocity. Thus, particularly in a hydraulic breast box, the conditions for the utilization of the process of this invention are particularly advantageous.

It should also be noted that damping or attenuation method is especially effective when the pressure drop, between the measuring site (3) and the correction site (4) is in the range of 0.3 to 3 bar, with the customary pressure drop in papermaking machine breast boxes being about 0.5 to 1 bar.

There exist special breast boxes in which the imparting of the damping, at the correction site, is particularly simple. These special breast boxes are those, which in the region of the upper wall of the nozzle chamber, due to the existing high pressure therein and the large area, have special actuatable bending or flexing compensation mechanisms, for example, fillable flexible bodies. It is quite feasible, via the use of suitable configuration and activation of the flexing compensation to transfer correction impulses into the material suspension, that is to superimpose additional pressure impulses to the only minor or unchanging pressure for the reception of the stationary forces.

Piezoelectric crystals can also be utilized between the nozzle wall and the support devices since they react less sluggishly to the correction signal. A further possibility for damping the pressure pulsations is the addition or removal of media at the correction site. It is evident that, via the addition or removal of a fluid, the pressure there can easily be varied.

A further possibility is the addition of a membrane at the correction site, wherein the membrane is subjected to oscillations via which the quantity to be measured, at the measuring site, is controlled.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the invention and the surrounding environment in which the invention is employed have been depicted therein, in order to simplify the illustrations, as needed for those skilled in the art to readily understand the underlying principles and concepts of the invention.

Figure 1:
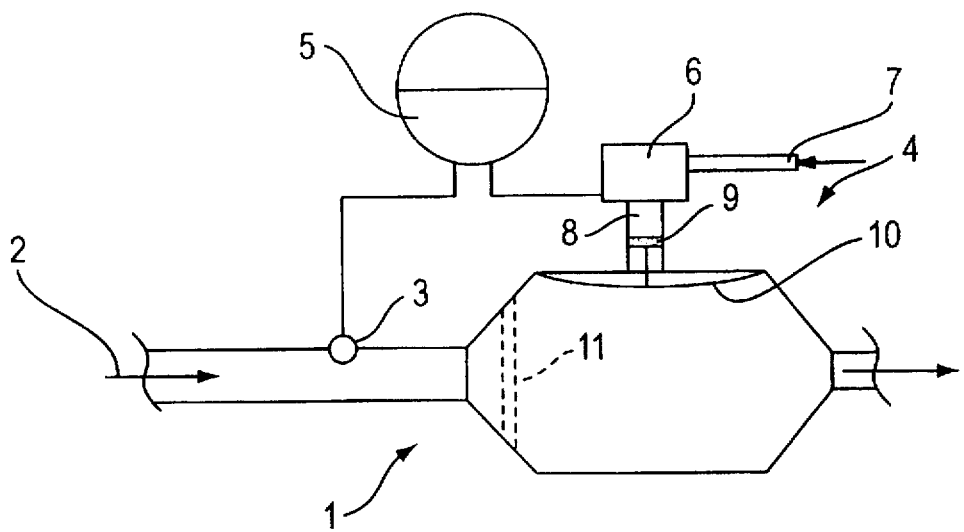
FIG. 1 is a schematic showing of an example of the inventive process of this invention.

FIG. 1 discloses a fluid 2, flowing through a closed system 1. The fluid pressure is determined at measuring site 3 and conveyed, as a measuring signal, to a control loop 5, which, in this example, activates a pressure supply device 6, with the aid of a fluid 7 which is so entered or exhausted into cylinder 8 that a piston 9, via a membrane 10, can transfer pressure impulses, at a correction site 4, into fluid 2. The fluid flow, between measuring site 3 and correction site 4, undergoes a pressure drop, whereby the pressure drop is occasioned or caused by indicated throttle portion 11.

Figure 2:
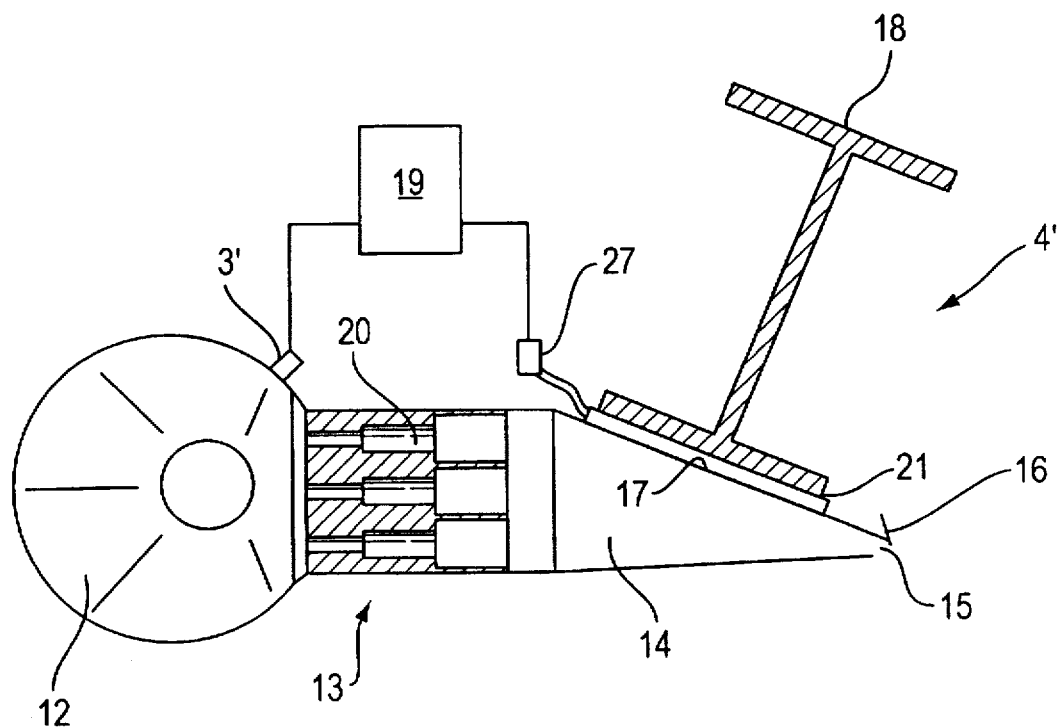
FIG. 2 schematically shows the breast box as an example of an apparatus for practicing the inventive process of this invention.

FIG. 2 shows, via a breast box for a papermaking machine, an apparatus for performing or carrying out the process. It shows a flow spreader 12, acting here as a supply chamber, in which the flowing fluid, here in the form of a material suspension, is distributed over the entire width of the breast box. The fluid then flows from flow spreader 12, via a turbulence producer 13, into nozzle chamber 14 which serves as a fluid accumulator chamber, with nozzle chamber 14 here being provided with a multiplicity of stepped diffusors 20, namely so-called micro turbulence producers, that greatly increase the turbulence in the stream or flow, but which also cause a significant pressure drop. Since the pressure measuring device 3' and the device for the controlled imparting of pressure impulses 4' are arranged as shown, all viewed in the flow direction of the stream, this arrangement enables the process in accordance with the invention. The measurement signal from pressure measuring 3' is further conveyed to device 4' for manipulating the controlled imparting of pressure impulses. At device 4', in this example, the pressure impulses that serve for the damping are produced by means of piezoelectric element 12, and, as is known, a piezoelectric element can convert electrical potential (voltage) into deformation. These deformations are transferred through an upper wall 17, which is a part of the breast box, into the suspension stream directly located thereunder. Due to the high resulting forces, the structures are braced or supported via a double T or an I beam, with the suspension thereafter leaving the breast box via an exit gap 15. Further fine control can, but need not, ensue via an orifice 16.

Figure 3:
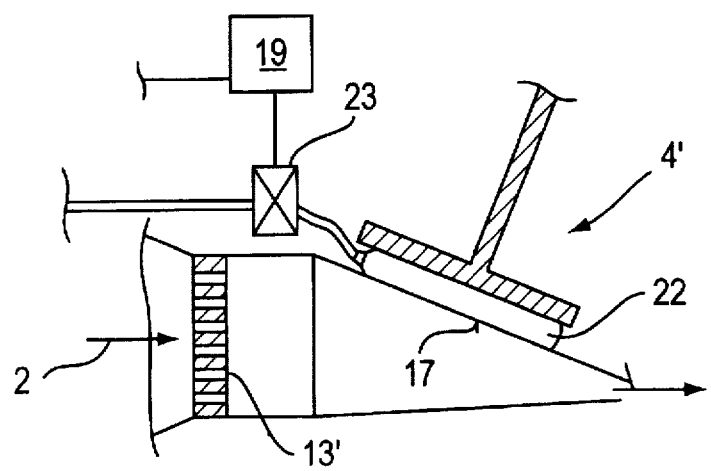
FIG. 3 schematically shows a portion of a further breast box.

FIG. 3 shows, in the first instance, that the pressure drop can also be occasioned with a more simple perforated plate 13' and, in addition, instead of a piezoelectric element for controlling the imparting of pressure impulses, device 4 4' takes the form of a fillable, flexible element 21 is shown, which is also in a position to produce pressure pulsations and to transfer same, via upper wall 17 of the breast box, to the suspension.

Figure 4:
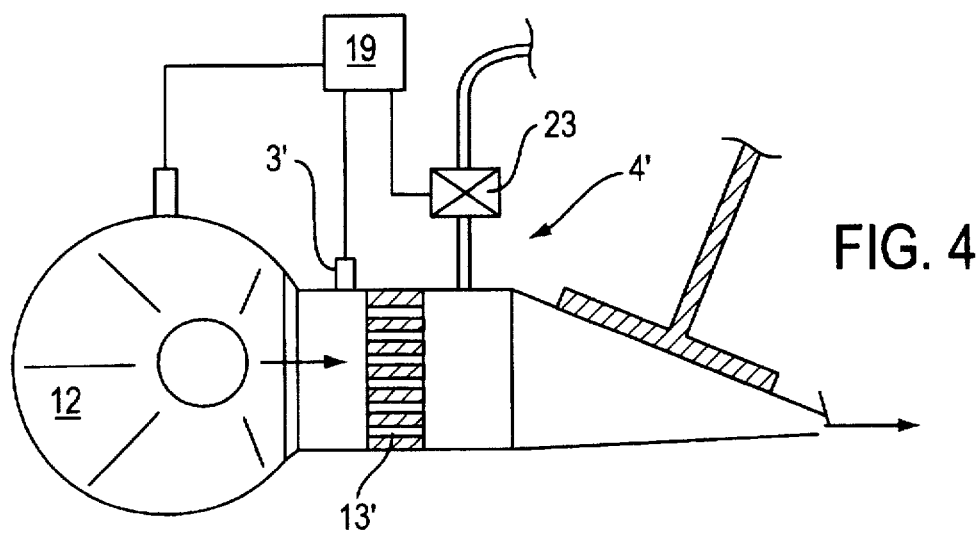
FIG. 4 schematically shows a portion of yet another breast box.

In the FIG. 4 embodiment, the pressure impulse via the input or outlet of a fluid, is occasioned via a multitude of valves 23, only one of which is illustrated.

With regard to the drawings, it should be noted that they should be viewed and understood as side views of a relatively wide machine or mechanical parts and, in order that the corrections are carried out efficiently, over the entire width thereof, the correction position can be very wide itself, or several units thereof are arranged adjacent to each other.

Figure 5:
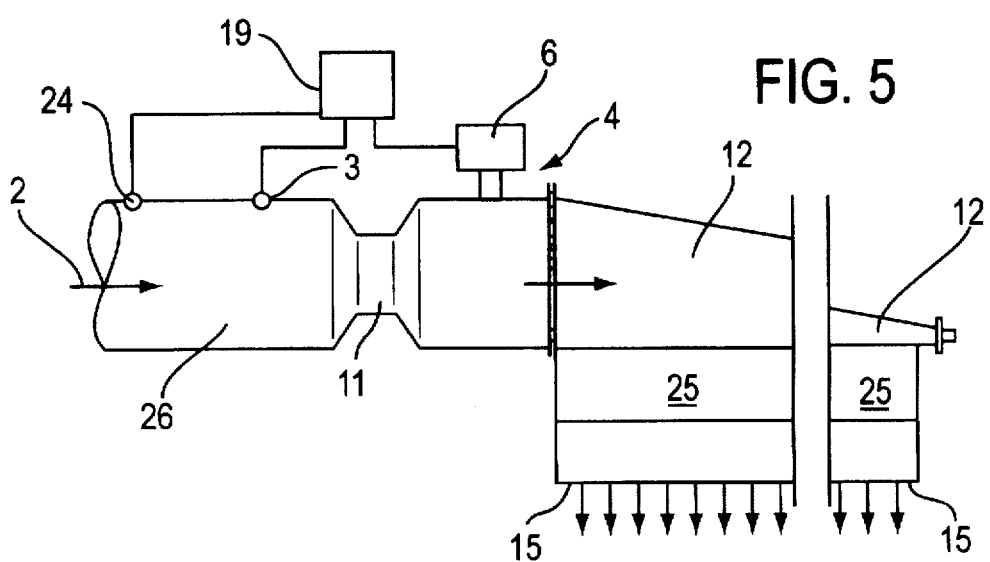
FIG. 5 is a schematic showing of the use of this process in a supply system for a breast box.

FIG. 5 is a schematic showing of the damping in the material supply system of a breast box wherein the fluid 2 arrives at the flow spreader 12 through a pipe line 26. During this flow, fluid 2 passes an acoustic measuring site 24, the measuring site 3 for pressure pulsations, a throttle portion 11 for pressure drop or reduction, and the correction site 4. Since here, as a rule, circular cross sections are used, a single correction position can be sufficient, since the distribution across the entire width only takes place in flow spreader 12. The stream or flow is then guided to exit gap 15 through turbulence producer 25.

FIGS. 2–5 each show a controller 19 which manipulates the signal that arrives from measuring site 3 or pressure measuring device 3'. The signal which in turn emanates from controller 19 then controls or manipulates, for example, valve 23 or pressure supply device 6 or rectangular box 27, in FIG. 2, which serves as the power supply for providing electrical potential (voltage) for piezo-electric element 21.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed is:

1. A process for the damping of pressure pulsations in a fluid flowing in a closed system, the process comprising:
   measuring, in at least one measuring site, a time, indication, and strength of pressure pulsations to be damped;
   imparting, in at least one correction site, remote from the measuring site, pressure impulses into the flowing fluid;
   dropping the pressure of the flowing fluid between the measuring site and the correction site to an amount at least approximately one-half as large as a pressure drop between the correction site and an exit of the flowing fluid from the closed system by guiding the fluid through one of a throttle and a turbulence device; and
   manipulating the imparting of the pressure impulses in accordance with the time, direction and strength of the pressure pulsations such that the pressure impulses are imparted at one of substantially at the same time as, and slightly later in time than, each measured pressure pulsation, but in an opposite direction.

2. The process of claim 1 wherein the fluid is a fiber suspension.

3. The process of claim 1 further including, locating the correction site after the measuring site in the fluid flow direction.

4. The process of claim 1, wherein the pressure drop, between the measuring site and the correction site ranges between 0.3 and 3 bar.

5. The process of claim 3, wherein the pressure drop, between the measuring site and the correction site ranges between 0.3 and 3 bar.

6. The process of claim 1 further including, producing the pressure impulses by the deformation of a wall adjoining the fluid at the correction site.

7. The process of claim 4 further including, producing the pressure impulses by the deformation of a wall adjoining the fluid at the correction site.

8. The process of claim 1 further including, producing the pressure impulses via one of the addition and subtraction of a fluid at the correction site.

9. The process of claim 1, wherein the fluid flow, after passing the correction site, undergoes a further pressure drop of at least 1 bar.

10. The process of claim 1, wherein the pressure drop occurs in a turbulence producer, with the turbulence producer being located between the measuring site and the correction site.

11. The process of claim 1, wherein the time instant of the imparted pressure impulse occurs slightly later than that of the measured pressure pulsation that is to be compensated, with the time shift corresponding approximately to a value which results from the distance of the correction site from the measuring site, divided by the acoustic velocity of the fluid.

12. The process of claim 1 further including, measuring the acoustic velocity of the fluid within the closed system and utilizing same for the control of the time instant of the pressure impulse.

13. An apparatus for performing a process for damping pressure pulsations in a fluid flowing in a closed system, the apparatus comprising:

a fluid supply chamber including a measuring sites;

a fluid accumulator chamber including a correction site;

a pressure measuring device positioned within the fluid supply chamber;

a controller that controls and imparts pressure impulses in the fluid accumulator chamber;

one of a hydraulic throttle device and a turbulence device positioned between the fluid supply chamber and the fluid accumulator chamber; and the controller controlling and imparting the pressure impulses to occur in a direction opposite to the measured pressure pulsations and at one of a time of substantially simultaneously with and a time slightly later than the pressure pulsations occur.

14. The apparatus of claim 13 further including that a turbulence producer, having a plurality of stepped diffusors, is located between the fluid supply chamber and the fluid accumulator chamber, with the correction site being located downstream from the measuring site.

15. The apparatus of claim 13 further including that a turbulence producer, in the form of a static mixer, is located between the fluid supply chamber and the fluid accumulator chamber, with the correction site being located downstream from the measuring site.

16. The apparatus of claim 13, wherein the pressure impulse, imparted at the correction site, is transferred to the fluid by means of a controllably deformable wall.

17. The apparatus of claim 16, wherein the deformation is accomplished via a fluid-fillable pressure chamber activated by the controller, with the pressure chamber including a deformable wall on the side facing the fluid.

18. The apparatus of claim 16, wherein the deformation is achieved hydraulically via a piston-cylinder-system activated by the controller.

19. The apparatus of claim 16, wherein the deformation is achieved electrically via a piezoelectric element activated by the controller.

20. The apparatus of claim 13, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

21. The apparatus of claim 14, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

22. The apparatus of claim 15, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

23. The apparatus of claim 16, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

24. The apparatus of claim 17, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

25. The apparatus of claim 18, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

26. The apparatus of claim 19, wherein the apparatus takes the form of a hydraulic breast box; wherein the measuring site is located at a flow spreader which serves as the fluid supply chamber; wherein the correction site is located at a boundary wall of a nozzle chamber which serves as a fluid accumulator chamber; and wherein the nozzle chamber includes an exit gap for the fluid.

27. The apparatus of claim 20, wherein the correction site is located on an upper wall of the nozzle chamber which serves as a fluid accumulator chamber and wherein the imparting of the pressure impulses occurs via the use of mechanical parts that serve to receive the static pressure forces, whose forces, acting on the fluid, are variable.

* * * * *